United States Patent [19]
Shaver

[11] Patent Number: 5,190,604
[45] Date of Patent: Mar. 2, 1993

[54] WINDSHIELD INSTALLATION TOOL

[76] Inventor: Craig A. Shaver, 37888 Riviera Rd., St. Cloud, Minn. 56303

[21] Appl. No.: 819,270

[22] Filed: Jan. 10, 1992

Related U.S. Application Data

[62] Division of Ser. No. 510,106, Apr. 17, 1990, Pat. No. 5,085,415.

[51] Int. Cl.⁵ .................................................. B60J 1/00
[52] U.S. Cl. .................................. 156/108; 29/281.4; 29/281.5; 29/468
[58] Field of Search ............. 156/108, 579; 29/281.5, 29/468, 281.4, 469; 296/84.1, 90, 96.12

[56] References Cited

U.S. PATENT DOCUMENTS

| | | | |
|---|---|---|---|
| 2,312,914 | 3/1943 | Koszeghy | 269/69 |
| 3,829,153 | 8/1974 | Fussell, Jr. et al. | 296/90 |
| 4,466,601 | 8/1984 | Raines | 269/79 |
| 4,779,919 | 10/1988 | Muller | 156/108 X |
| 4,909,869 | 3/1990 | Sakamoto et al. | 156/108 X |
| 4,981,288 | 1/1991 | Goss | 269/79 |

FOREIGN PATENT DOCUMENTS

| | | | |
|---|---|---|---|
| 261129 | 5/1964 | Australia | 296/84.1 |
| 1-208285 | 8/1989 | Japan | 29/281.5 |

Primary Examiner—David A. Simmons
Assistant Examiner—Mark A. Osesle
Attorney, Agent, or Firm—Kinney & Lange

[57] ABSTRACT

An extandable positioning tool with a base for mounting within the passenger compartment of a vehicle, and having an extension that can pass through a windshield opening to support a windshield to be installed thereover. The tool may be temporarily attached to the steering wheel.

6 Claims, 4 Drawing Sheets

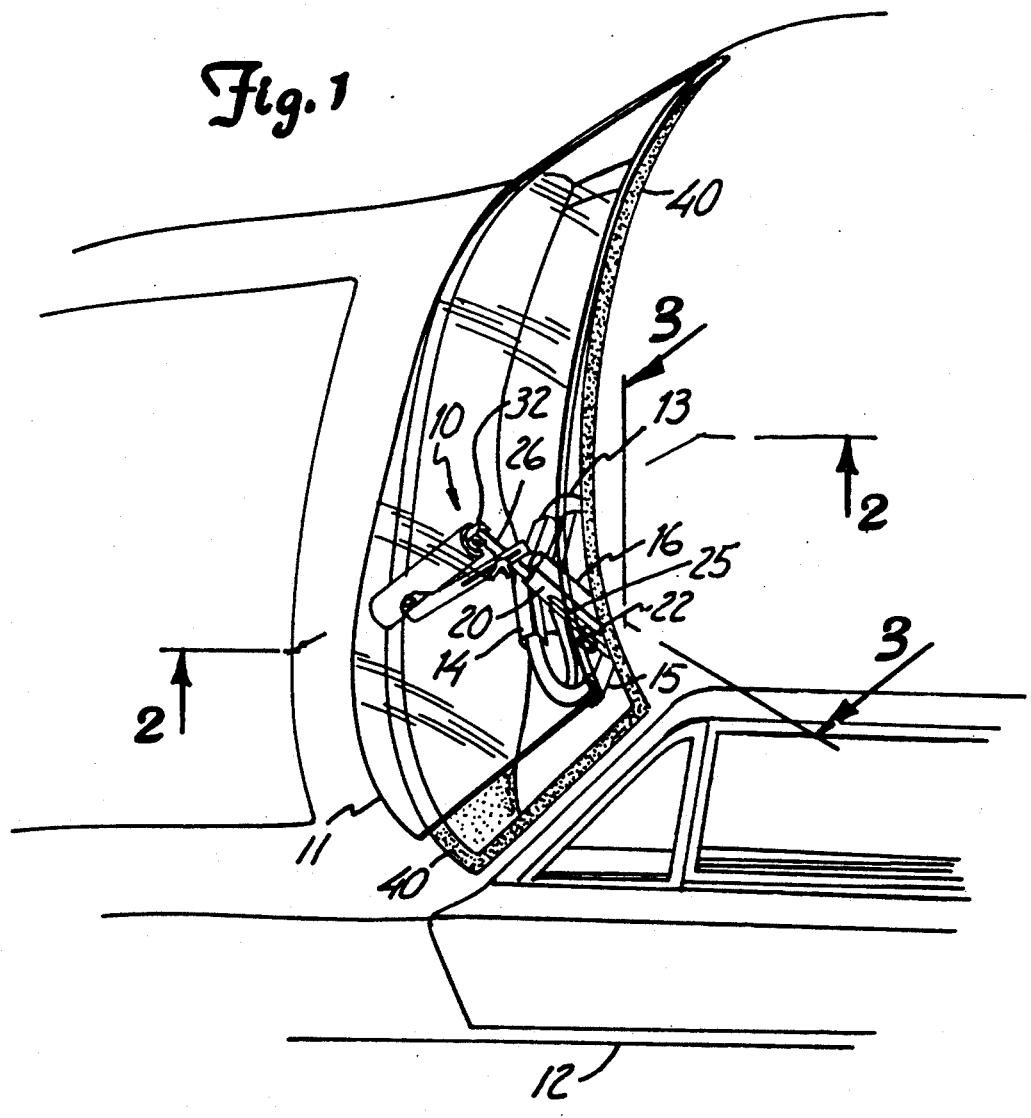

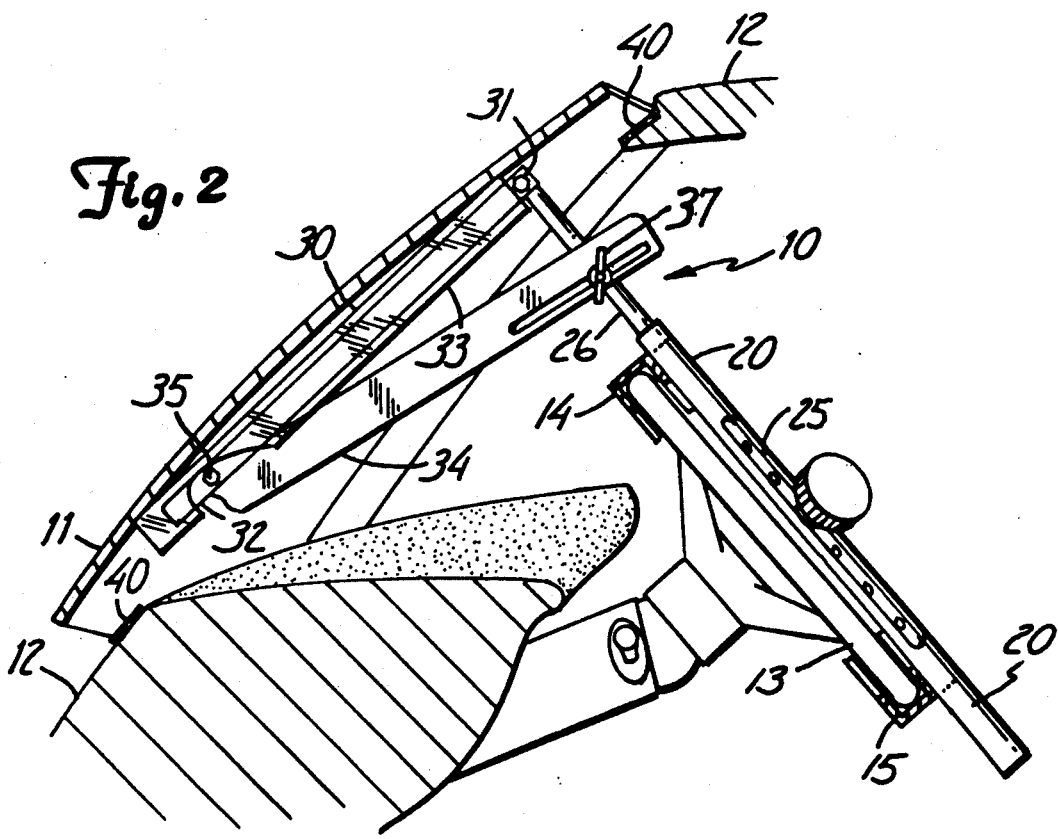
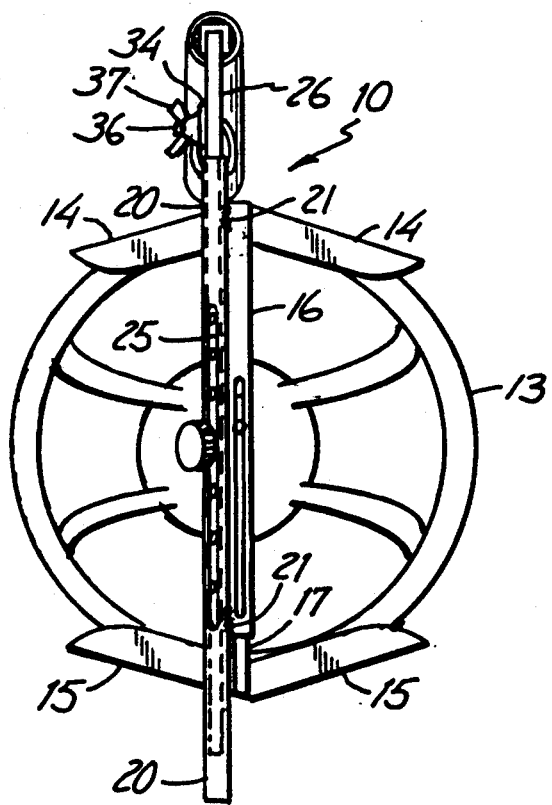

WINDSHIELD INSTALLATION TOOL

This is a divisional application of application Ser. No. 07/510,106, filed Apr. 17, 1990 now U.S. Pat. No. 5,085,415.

BACKGROUND OF THE INVENTION

The present invention relates to tools for installing windshields in vehicles and, more particularly, to tools for use in the manual installation of windshields in vehicles.

Vehicles in use encounter a number of road hazards. Among these are windshield damage due to rocks being thrown up by vehicles traveling ahead. These occurrences, and others, lead to damage to vehicle windshields.

Replacing windshields has evolved toward providing more convenient service to customers therefor. This includes installing replacement windshields, in many instances, at the location of the customer's parked vehicle during times the customer is attending to other affairs rather than having the customer bring the vehicle into a shop for that procedure. Firms providing such services find keeping costs down to remain competitive very important, and therefore desire to send out but a single person as an installer to perform the task of replacing a windshield.

However, windshields are such extended and heavy objects as to be quite cumbersome; yet, they are nevertheless fragile and quite susceptible to damage by any mishandling. This imposes a substantial burden on an individual installer, and may eliminate smaller or less strongly built people from such employment as well as lead to the possibility of unexpected injuries. As a result, there is a substantial desire for aids to such installers to permit them to handle windshield installations with a reduced risk of damage to the windshield or person while accomplishing these installations with an acceptable quality.

SUMMARY OF THE INVENTION

The present invention provides an extendable positioning tool with a base means that can be temporarily mounted on a surface in the passenger compartment of a vehicle, and which has an extension means such that it can pass through an opening in the vehicle over which a cover is intended to be installed. The tool may be temporarily attached to the steering wheel therein and the extension portion extended through the opening at that point, the windshield being installed by the installer positioning one end of the windshield against the extension portion of the tool and the other approximately in its desired final location on the vehicle across the opening. The extension portion has an engagement portion thereon with a surface formed by a material resistant to windshields sliding thereacross so that this surface can engage the windshield and hold it in position. Thereafter, the extension portion is retracted within the vehicle to permit the windshield to come down into its desired final position across the opening.

BRIEF DESCRIPTION OF THE DRAWINGS

FIG. 1 shows a pictorial view of a vehicle after a step performed in installing a windshield in a vehicle using the present invention, FIG. 2 is a cross section view of a portion of FIG. 1, FIG. 3 is an elevation view of a fragmentary portion of FIG. 1.

DETAILED DESCRIPTION OF THE PREFERRED EMBODIMENTS

Figure 4:
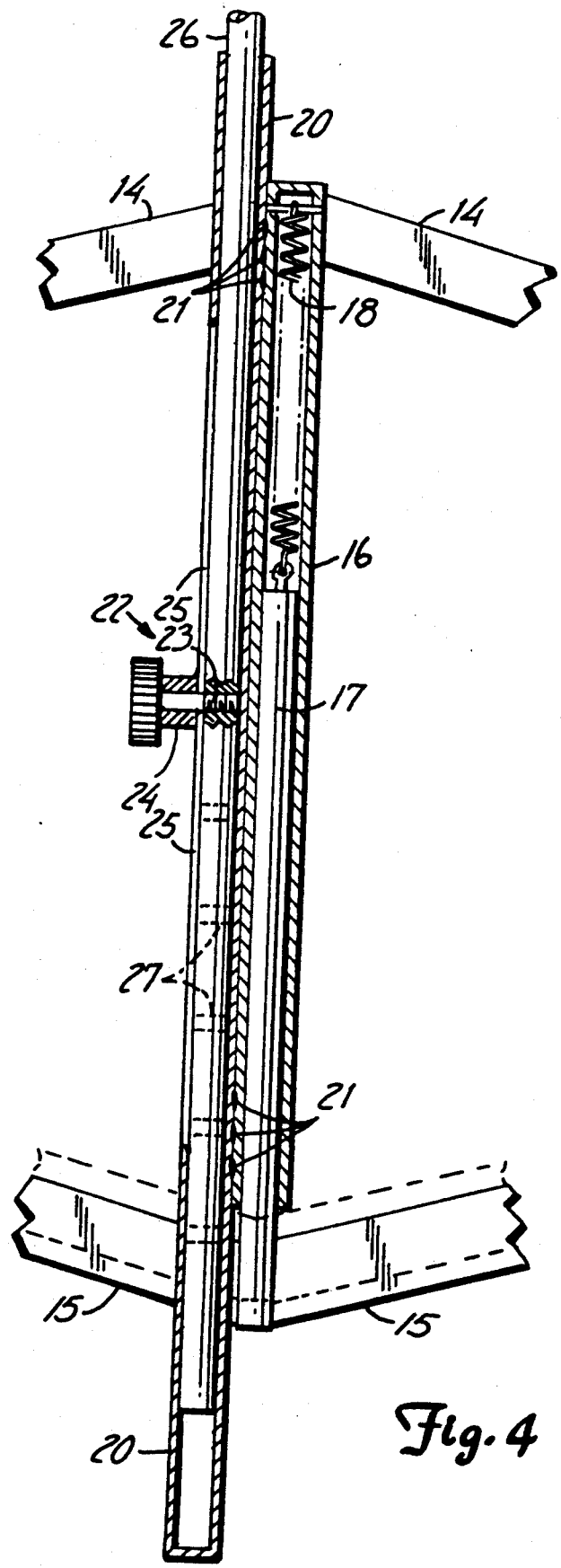
FIG. 4 is a cross section view of the present invention.

FIG. 1 shows in a pictorial view an installation tool, 10, of the present invention supporting a windshield, 11, in the process of being installed in a vehicle, 12. Installation tool 10 is temporarily attached to a steering wheel, 13, in vehicle 12 for this purpose.

This temporary mounting arrangement for tool 10 on steering wheel 13 can be better seen in FIG. 2 which is a cross section view of a portion of FIG. 1. There, tool 10 can be seen to have a pair of channel brackets, 14 and 15, formed typically using aluminum alloy channel shaped beams, i.e. channel beam stock. The channel openings in these stock pieces used in these brackets face one another such that these brackets can each be positioned over a portion of steering wheel 13 between them.

FIG. 3, which is a fragmentary elevation view of FIG. 1, shows this more clearly. Channel brackets 14 and 15 each have two channel stock lengths joined with one another at an end of each, but at an angle between them other than 180°, such that the channel openings of each piece are rotated slightly toward one another to thereby more closely approximate the circular circumference of steering wheel 13.

Channel bracket 14 is shown fastened to a bracket support sleeve structure, 16, typically of an aluminum alloy. Channel bracket 15, on the other hand, is shown fastened to a bracket support shaft, 17, again typically of an aluminum alloy.

FIG. 4 shows in an elevation cross section view of tool 10 the relationship between bracket support sleeve 16 and bracket support shaft 17. As can be seen there, a spring, 18, connects the interior of sleeve 16 to the end of shaft 17 opposite that to which angle bracket 15 is connected. Thus, angle bracket 15 can be selectively separated further from bracket 14 by sufficient force applied thereto and against spring 18. As a result, brackets 14 and 15 can clamp onto steering wheel 13 through being held thereagainst by the retractive force of spring 18.

There is a second sleeve structure, usually of an aluminum alloy, provided in tool 10 as an extension sleeve structure, 20, which is fastened to bracket sleeve 16 side by side. FIGS. 3 and 4 show this fastening accomplished by welds, 21.

Extension sleeve 20 has a holding arrangement, 22, formed by a screw, 23, including a knob with a shoulder, 24, thereunder on one end of that screw. Holding arrangement 22 is provided, in conjunction with a slot, 25, in extension sleeve 20, to hold therein at a selected position an extension rod, 26, typically of an aluminum alloy. Extension rod 26 has a series of spaced and threaded holes, 27, provided therethrough into which the opposite end of screw 23 can be positioned to thereby lock rod 26 at a selected extension distance beyond extension sleeve 20. This locking is accomplished by screwing screw 23 sufficiently far into a selected hole 27 so that shoulder 24 is tightly against sleeve 20 at the sides of slot 25 therein. Thus, extension rod 26 can have its position adjusted with respect to extension sleeve 20, and bracket sleeve 16, by the choice of holes 27 into which screw 22 is inserted.

As can be seen in FIG. 2, this allows extension rod 26 to extend from steering wheel 13 to just within the passenger compartment of vehicle 12, or to points outside vehicle 12, by extending from steering wheel 13 through the opening in that vehicle which windshield 11 is to cover. Tool 10 has an engagement arm, 30, connected to extension rod 26 by a pivot means, 31, a surface of this arm serving to hold windshield 11 in the position shown in FIGS. and 2. Thus, extending extension rod 26, at its point of connection to engagement arms 30, extends sufficiently far beyond extension sleeve 20 to result in keeping the end of windshield 11 nearest steering 13 from being against vehicle 12.

Engagement arm 30 is formed of a rigid arm portion, 32, with a tubular covering, 33, thereover. Tubing 33 has an outer surface which must be of such a nature as to be highly resistant to windshield 11 sliding thereacross. A suitable tubular material has been found to be flexible polyvinyl chloride tubing.

Suitable results in holding windshield 11 will be obtained if engagement arm 30 has the surface of tubing 33 against windshield 11 in at least two separated places thereon, even if the curvature of windshield 11 prevents complete mating of an elongated upper surface portion of tube 33 that is as long as that tube with a similar portion of the surface of that windshield. This engagement of windshield with engagement arm 30 and tube 33 can be accomplished by locking arm 30 at a suitable angle with respect to extension rod 26. Such locking is provided by a locking arm, 34, which is connected by a pivot, 35, to rigid arm portion 32 of engagement arm 30. The opposite end of locking arm 34 has a slot provided therein which fits over a screw, 36, extending out of extension arm 26. A wing nut, 37, fits over screw 36 to clamp lock arm 34 to the side of extension arm 26 if wing nut 37 is screwed down tightly against lock arm 34. In that situation, a defined angle between engagement arm 30 and extension arm 26 can be selected and maintained against the weight of windshield 11.

Thus, in use, tool 10 is mounted on steering wheel 13 by separating channel brackets 14 and 15 sufficiently to place them over wheel 13 and then permitting spring 18 to draw brackets 14 and 15 against it. Extension arm 26 is then adjusted as necessary to extend through the opening over which windshield 11 is to be placed plus a short distance beyond vehicle 12. An adhesive, 40, for securing windshield 11 against vehicle frame 12, is provided around the periphery of the windshield opening in that vehicle.

The installer next lifts windshield 11 over the opening in vehicle 12, positioning windshield 11 against engagement arm 30 toward one end of windshield 11, and positioning the other end of windshield 11 toward the location in which it will finally be after installation is complete. The installer, relieved of lifting the weight of the entire windshield after it is on engagement arm 30, can then conveniently adjust the end of the windshield away from the end of tool 10 to a position that is just where it should be for a proper fit across the opening in vehicle 12 as the opposite end is subsequently installed. That end of windshield 11 away from tool 10 is placed against adhesive 40 approximately in the desired final location thereof and, thereafter, the installer can come around to the other side of vehicle 12 at the opposite end of windshield 11 closest to steering wheel 13.

The installer needs then to just release screw 23 in holding arrangement 22 sufficiently by unscrewing to let extension rod 26 slip downward within extension sleeve 20 while holding the nearest end of windshield 11. Thereafter, the installer can easily place that end of windshield in its proper position across the opening in vehicle 12 and against adhesive 40. Thus, the installer, after getting an end of windshield 11 on engagement arm 30, need only lift one end of windshield 11 at a time to accurately position windshield 11 on adhesive 40 over the opening in vehicle 12.

Figure 5:
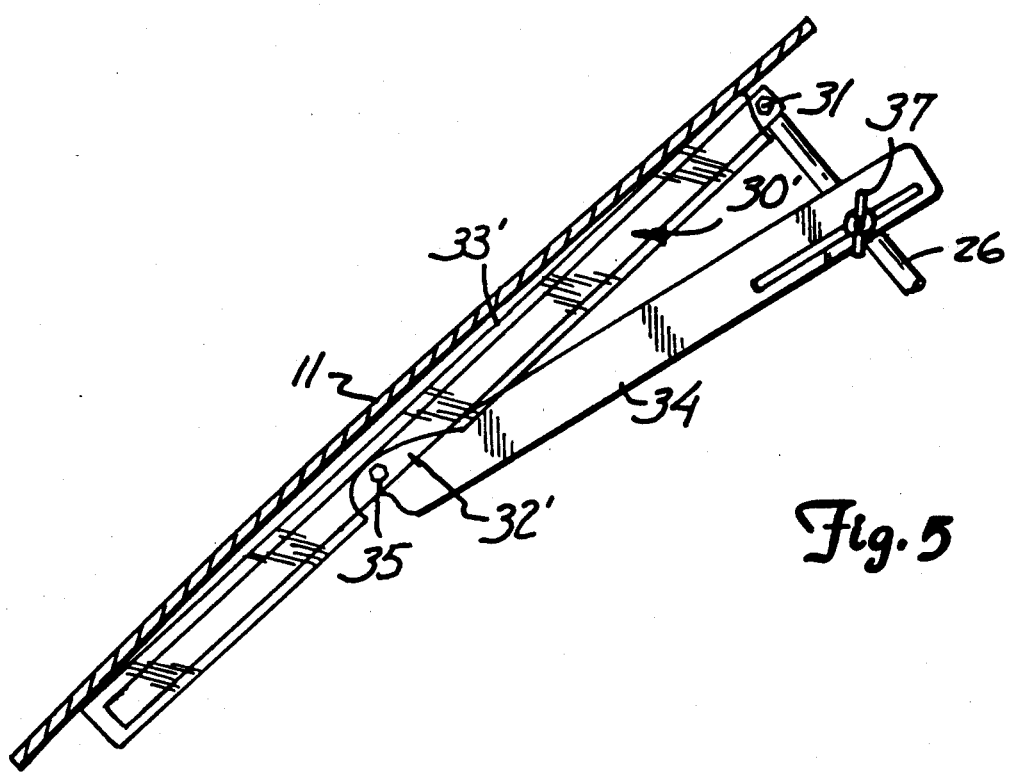
FIG. 5 is an alternative embodiment of the present invention.
Figure 6:
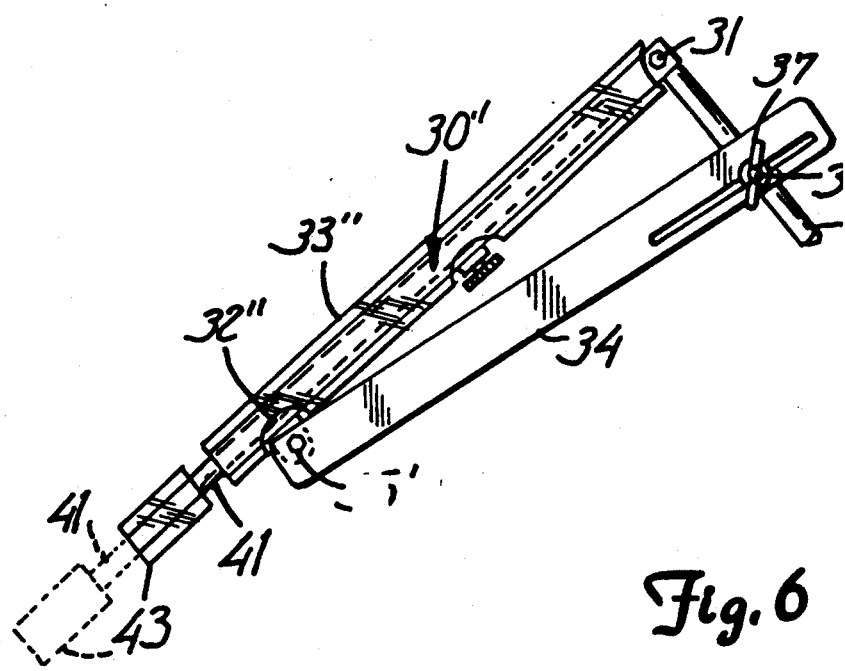
FIG. 6 is a further alternative embodiment of the present invention.

FIGS. 5 and 6 show alternative embodiments of engagement arm 30. These embodiments can be used in connection with some of the larger windshields provided in some kinds of vehicles. Thus, extension arm 30 of FIGS. 1 through 4 is shown as a longer arm in FIG. 5 in extending further past pivot 35, and so is redesignated 30' there. Analogously, the rigid portion of arm 30' is redesignated 32' and the tubing is redesignated 33'. Otherwise, its construction is essentially that shown in FIGS. 1 through 4.

Recently, more radical designs have been chosen for vehicles leading to a proliferation of different sizes of windshields. Rather than attempting to provide engagement arm 30' in multiple lengths as suggested in with FIG. 5, an adjustable length engagement arm can be provided as shown in FIG. 6. Thus, the engagement arm is again redesignated in FIG. 6, the designation there being 30''. As can be seen there, the rigid portion of engagement arm 30'' has been formed as a sleeve and is redesignated 32'' with the tubing thereover redesignated as 33''. The pivot arrangement for locking arm 34 and sleeve 32'' has been altered to leave the interior of sleeve 32'' open and so has been redesignated 35'. An arm lengthening shaft, 41, is permitted to slide within sleeve 32'' to thereby permit arm 32'' to effectively have different lengths as indicated by the alternative dashed line position shown for that shaft in FIG. 6. The position of rod 41 can be varied and, once chosen, that position can be locked in place by a further holding arrangement, 42, which is shown operating as a set screw with a knob on its end, but could alternatively be of the same nature as holding arrangement 22. The end of rod 41 extending from rigid member 32' has a polyvinyl chloride tubing portion, 43, provided therearound upon which the glass of windshield 11 is to be supported.

Although the present invention has been described with reference to preferred embodiments, workers skilled in the art will recognize that changes may be made in form and detail without departing from the spirit and scope of the invention.

What is claimed is:

1. A method for manually installing a relatively large cover in a vehicle over an opening therein, said method comprising:
   mounting an extendable positioning means temporarily in said vehicle, said extendable positioning means having an extension portion therein which can be selectively positioned between being substantially entirely within said vehicle and extending partially through said opening therein;
   extending said extension portion partially through said opening in said vehicle;
   positioning a portion of said cover in approximately its desired location on said vehicle adjacent said opening with a second portion of said cover on said extension means; and retracting said extension means to being within said vehicle to permit said cover to be positioned on said vehicle across said opening as desired.

2. The method of claim 1 wherein said cover is at least partially transparent.

3. The method of claim 1 wherein an adhesive is applied to a surface portion selected from surfaces of said cover and said vehicle adjacent said opening before said cover is positioned at least in part against said vehicle and against said extension means.

4. The method of claim 1 wherein said extendable positioning tool is temporarily mounted on a steering wheel of that vehicle in which installation of said cover is to take place.

5. The method of claim 2 wherein said opening is one for a windshield, and said cover is a windshield.

6. The method of claim 4 wherein said extendable positioning tool is temporarily mounted on said steering wheel by a clamping means in which clamping forces are provided primarily by a spring means.

* * * * *